Nov. 24, 1964     E. J. SMITH ETAL     3,158,855
DIGITAL TO ANALOG CONVERTER AND INDICATOR
Filed Aug. 15, 1960     3 Sheets-Sheet 1

Fig. 1

EDGAR J. SMITH
CASIMIR J. DOMASZEWICZ
INVENTORS

BY Andrew L. Bain

ATTORNEYS

Nov. 24, 1964     E. J. SMITH ETAL     3,158,855
DIGITAL TO ANALOG CONVERTER AND INDICATOR
Filed Aug. 15, 1960     3 Sheets-Sheet 2

| A | B | C | |
|---|---|---|---|
| 1 | 1 | 0 | RELAY NOT OPERATED |
| 1 | 0 | 1 | RELAY OPERATE |
| 0 | 1 | 1 | RELAY OPERATE |
| 0 | 0 | 0 | RELAY NOT OPERATED |

EDGAR J. SMITH
CASIMIR J. DOMASZEWICZ
INVENTORS

BY Andrew L. Bain

ATTORNEYS

Nov. 24, 1964 E. J. SMITH ETAL 3,158,855
DIGITAL TO ANALOG CONVERTER AND INDICATOR
Filed Aug. 15, 1960 3 Sheets-Sheet 3

EDGAR J. SMITH
CASIMIR J. DOMASZEWICZ
INVENTORS

BY Andrew L. Bain

ATTORNEYS

United States Patent Office 3,158,855
Patented Nov. 24, 1964

3,158,855
DIGITAL TO ANALOG CONVERTER AND INDICATOR
Edgar J. Smith, Verona, and Casimir J. Domaszewicz, Paterson, N.J., assignors to General Precision Inc., Little Falls, N.J., a corporation of Delaware
Filed Aug. 15, 1960, Ser. No. 56,081
5 Claims. (Cl. 340—347)

This invention generally relates to digital-to-analog converters and is more particularly concerned with improvements in such devices that accurately control the angular position of a shaft according to a digital input signal.

It is, accordingly, a principal object of the invention to provide a digital-to-analog converter that is extremely accurate and employs feedback control to achieve rapid response and to insure accuracy.

A further object is to provide such a converter for positioning a shaft in response to a digital input over a complete revolution or 360° arc.

By changing the gearing of various elements, the angular range could be expanded to include angles greater than 360°, or multiples thereof, or where a smaller angular range is required, any angle less than 360° can be provided for.

A still further object is to provide such a converter that may be made quite small in size and lightweight.

Another object is to provide such a converter that will reversibly rotate the shaft through the smallest arc to reach the desired angular position.

Another object is to provide such a converter that positions rotatable shaft more rapidly where its deviation from a desired angular position is greater but progressively diminishes in speed as it approaches the desired angular position.

A still further object is to provide a digitally energized motor control system having digital feedback.

Other objects and many additional advantages will be more readily understood by those skilled in the art, after a detailed consideration of the following specification taken with the accompanying drawing wherein:

FIGURE 1 is an electrical schematic drawing, partially in block diagram form, and illustrating one preferred embodiment of the invention;

Figures 2, 3:
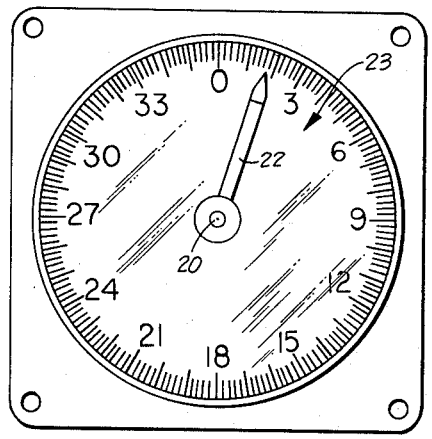
FIGURE 2 is a plan view illustrating the face of an indicator for use with the preferred embodiment.
FIGURE 3 is a diagram of the binary code logic employed in controlling the operation of the relays shown in FIGURE 1.

Referring now to FIGURE 1, there is shown a preferred digital-to-rotary or analog position system according to the invention, wherein a digital input signal being obtained from a source 10 and generated over a plurality of input lines 11 to 19, inclusive, is employed to accurately position the shaft 20 geared to a motor 21 such that the angular position of the shaft 20 accurately reflects the digital input signal, and such angular position may be observed by the angular position of a pointer 22 in an indicator 23 having a graduated angular scale.

The motor may be equipped with a built in or other type of reduction gear 115 or other device suitable for reducing the nominal motor shaft speed, to the reduced operating speed required.

Another reduction gear 116, may also be introduced between the shaft of the motor and the ADC 34.

Another reduction gear mechanism 117 may also be introduced between the ADC, and the indicator 23.

In its overall aspects, the invention is not limited to application as a digital-to-rotary position device, since the motor 21 may be replaced by any known integrating device that responds to electrical signals of one polarity to sum such signals, and to signals of opposite polarity to subtract from such sum, whereby the resultant accumulation may be stored and suitably indicated in analog form.

Considering the preferred system of FIGURE 1 in greater detail, the input digital signals being produced over lines 11 to 19 are directed to a relay matrix and are stored by means of a plurality of relays 24 to 32, inclusive. The angular position of the shaft 20 driven by the motor, is also converted into a digital feedback signal by means of a suitable analog-to-digital converter or ADC generally indicated by the block at 34, also shown in FIGURE 4, and hereinafter described in greater detail, and the digital feedback signals are directed backwardly to the relay matrix over a corresponding plurality of feedback lines 35 to 43, inclusive, and stored in a plurality of feedback relays 44 to 52, inclusive, in the matrix.

Figure 4:
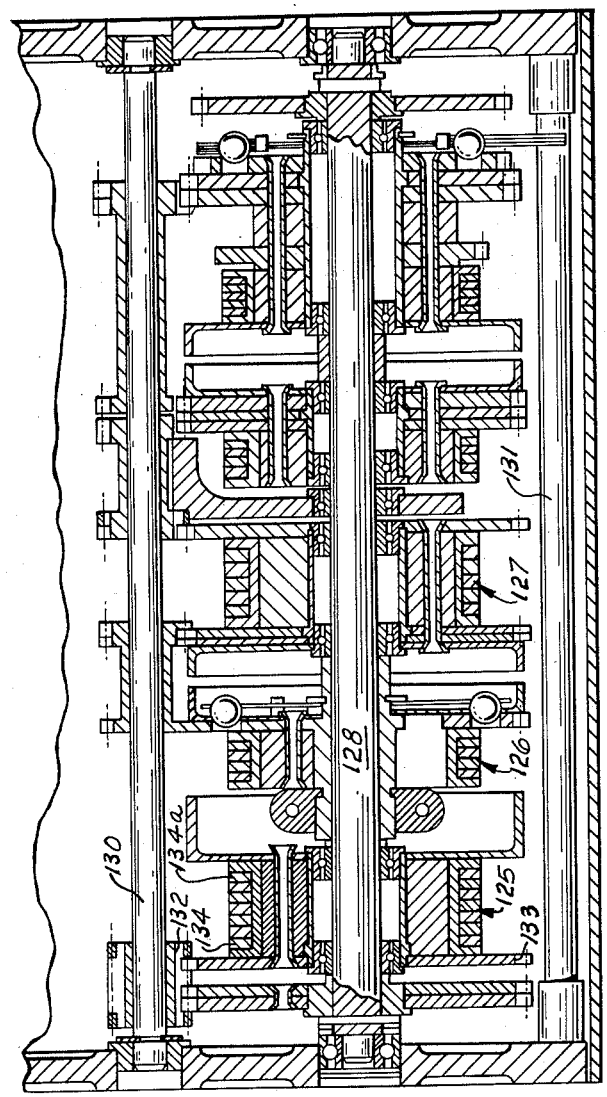
FIGURE 4 is a longitudinal section through one embodiment of the ADC, or analog-to-digital converter, used in conjunction with the circuit shown in FIGURE 1.

The ADC, shown in FIGURE 4, is primarily an analog-to-digital converter in which angles represented by the rotational angular position of a plurality of drums 125, 126, 127 mounted on a central shaft 128 are converted to digital signals.

The drums are rotated in stepped rotation relative to one another by a transfer mechanism which is introduced between each pair of adjoining drums.

A pair of transfer shafts 130, 131, parallel to the central shaft, support pinions 132 which control the rotation of the gears 133 attached to the individual drums, each set of gears including a series of segmental cut-outs which arrest the rotation of each individual drum, coordinated with the rotation of the next drum in the series. To that extent the relation between the drums is essentially the same as those of an angle counter.

Each of the drums has a series of circular segmental metal segments 134, 134a, imbedded in the circumferential outer surface thereof, the arcuate length of each of the segments, and the angular space therebetween indicating the angular position of a particular drum at a particular time interval.

The segments which are made of precious metals such as a gold alloy and the surfaces of the segments proper, which are flush with the outer surface of the drums, provide coded signals which indicate in a binary code the angular position of each of the segments of each drum.

A brush block is located adjacent the outer circumference of each of the drums, each brush block having a plurality of brushes which are substantially tangent to the individual drums supported thereby. The brushes, each of which has an arcuate tip or other type of contact integral with the outer end thereof, are adapted to engage the outer circumference of the drum to transfer the code signal to an external point.

The relay matrix functions to individually compare each order of the input digital signal with the corresponding order of the digital feedback signal and selectively directs an energizing voltage over one or the other of its output lines 53 and 54 to the motor field windings 55 and 56, thereby to reversibly position the motor shaft until the feedback digital signal over lines 35 to 43 equals the input digital signal over lines 11 to 19. Upon these signals being in correspondence, the field windings 55 or 56 of the motor are de-energized and the angular position of the motor shaft, corresponding to the input digital signal, is indicated by the position of pointer 22 on graduated dial 23 or by other known indicating means as desired. The shaft 20 driven by the motor thereafter remains at this angular position until the input digital signal is varied, whereupon the relay matrix system again functions to control the energization of the motor windings 55 or 56 until the shaft 20 driven by the motor is directed to its new angular position again corresponding to the commanding input digital signal.

In addition to comparing the input digital signal with the feedback digital signal and positioning the motor shaft accordingly, the relay matrix also performs intelligence functions that enable the motor shaft to be positioned both accurately and quickly. Among these functions, the relay matrix determines the correct direction of motor shaft rotation that would enable the shaft 20 driven by the motor to reach its desired angular position by traversing the smallest angle of rotation. For example, if the shaft 20 driven by the motor is residing at an angle of ten degrees (10°) and the digital input command signal varies to call for a three hundred and fifty degree (350°) position, the motor may be energized in the clockwise direction to traverse three hundred and forty (340°) of rotation to reach this new position or be energized in the counter-clockwise direction to traverse only twenty degrees (20°) of rotation. Obviously, by being energized in the counter-clockwise direction, the shaft 20 driven by the motor may reach its required position most rapidly, and according to the present invention the relay matrix senses or detects this condition and energizes the motor so that the shaft rotates in a counter-clockwise direction to rotate twenty degrees (20°).

Another of the functions performed by the relay matrix is the prevention of overshoot and hunting of the shaft about its commanded position. This function is performed by means associated with the relay matrix that progressively decreases the energization, and hence the speed of the motor, as the shaft 20 thereof approaches its commanded position.

Returning to FIGURE 1 for a detailed consideration of the relay matrix and its manner of performing the above functions, the relay matrix, as described in the drawing, is arranged to respond to a digital input in the pure binary code and having a total of nine orders, whereby it can receive in binary form numbers up to 512 and hence control the rotative position of the shaft 20 within a fraction of a degree up to a full three hundred and sixty degrees (360°) of rotation. However, it is not essential that the system receive only a binary coded digital input, but it may operate in response to other digital codes by minor variations. For example, the system may respond to a pure Gray code by substituting for each of the order relays 24 to 32, an "exclusive or" type of logic, having two relays which operate in opposition so that the logic circuit is energized only when one or the other relay winding is energized but not when both relay windings are energized. However, this alternative embodiment will be more readily understood after first considering the system operating in the binary code.

FIGURE 3 represents a logic diagram used in conjunction with the "exclusive or" relays, when substituted in place of the relays 24 to 32, shown in FIGURE 1.

In this diagram the "1" signal indicates "power on" to the specific relay, and the "0" signal "power off."

In the binary coded matrix arrangement, as shown, each order of the binary number is entered over a different one of input lines 11 to 19, inclusive, leading to a different one of input relays 24 to 32, inclusive, with the uppermost input line 11 receiving the highest order of the number or $2^8$ and the lowermost input lines 19 receiving the lowest order or $2^0$. Consequently, if the number received on the input lines is 293, for example, the input relays 24, 27, 30, and 32 are energized over input lines 11, 14, 17, and 19, and all other input relays are de-energized.

In a similar manner, each of the corresponding feedback signal relays 44 to 52, is also energized by a different one of the feedback lines 35 to 43, inclusive, leading from the ADC unit 34, whereby, if the shaft 20 driven by the motor occupies an angular position corresponding to the same number 293, the feedback relays 44, 47, 50, and 52 are energized but all other feedback relays remain in their de-energized condition.

One set of contacts for each of the input relays is connected in cascade with a set of contacts of the corresponding order of the feedback relays, whereby if both the input relay and the same order feedback relay are simultaneously energized, a voltage will not be directed over either output line 53 or 54 to energize the motor windings 55 or 56, whereas if either one of the input or feedback relays is energized but not the other, a voltage will be directed over one or the other output line 53 or 54 to reversibly energize the motor 21 in such direction that the input and feedback relay of that order are rendered in the same state of energization. For example, pre-supposing that the highest order input relay 24 is energized by a signal over line 11 and the corresponding order feedback relay 44 is not energized, then a voltage is directed from power line 60 to the movable contactor 61 of energized relay 24 and thence to its lower fixed contact 62. The lower fixed contact 62 of input relay 24 is electrically connected to the movable contactor 63 of feedback relay 44 that engages fixed contact 64, when feedback relay 44 is de-energized, to transmit the voltage over line 65 to matrix output line 53 which ultimately energizes one or the other of the motor windings 55 or 56 through the contacts 66 and 67 of reversing relay 69. The net result is that the motor 21 is energized by the voltage over power line 60 to rotate the shaft 20 which is driven by the motor until a feedback signal is produced over feedback line 35 serving to energize the highest order feedback relay 44, whereupon its movable contactor 63 breaks the circuit with fixed contact 64 removing the voltage from matrix output line 53. Thus, when the highest order input and feedback relays are in the same state of energization, an energizing voltage cannot pass through their cascaded contacts to energize the motor 21.

After the highest order input and feedback relays have compared the highest order of the digital input signal to the similar order of the digital feedback signal and rotated the motor 21 until these signals are the same, the energizing voltage over power line 60 is then directed to the cascaded contacts of the next highest order input and feedback relays 25 and 45, respectively, by being connected from the movable contactor 63 of feedback relay 44 to its lower fixed contact 70 and thence over line 71 to the movable contact 72 of input relay 25. The contacts of input relay 25 are connected in cascade with the contacts of corresponding feedback relay 45 in the same manner as are the contacts of the highest order input relay 24 and feedback relay 44, whereby if relays 25 and 45 are in the same state of energization, the energizing voltage from power line 60 does not pass over either of the matrix output lines 53 and 54 leading to the motor windings, but is in turn diverted to the next lower order set of input and feedback relays 26 and 46, respectively. On the other hand, if relays 25 and 45 are not both in the same state of energization, the energizing voltage is directed to the motor 21 in the same manner as discussed above to rotate the motor shaft 20 until it reaches an angular position corresponding to the next highest order of the digital input number.

In this described manner, each order of the digital input number is compared to the corresponding order of the digital feedback, in sequence, from the highest order to the lowest order, and the shaft 20 of motor 21 is progressively rotated until its ultimate angular position corresponds to the digital input signal, whereupon each of the feedback relays is in the same state of energization as the corresponding one of the input relays and the motor is de-energized until a new digital input signal is directed to the input relays calling for a new position of the motor shaft.

As the shaft 20 driven by the motor approaches the angle called for by the digital input signal, it is desired that its speed be reduced so that it will not overshoot its desired position or otherwise oscillate or hunt about its desired position. According to the present invention this function is performed by progressively reducing the energizing voltage being directed to the motor windings as the angular position of the motor shaft 20 approaches an angle close to its required position. To reduce the energization of the motor at this time, the motor energizing voltage passing through the cascaded contacts of the lower order relays, beginning at input relay 27, is progressively passed through increasing values or resistors before reaching the matrix output lines 53 and 54. For example, after the higher order feedback signal relays 44, 45 and 46 and 47 have been brought to the same condition of energization as the corresponding input relays 24, 25 and 26 and 27, the motor shaft 20 driven by the motor is located at an angular position that is not greater than about twenty degrees (20°) from its desired position. At this time, a comparison is being made between a lower order input signal on input line 15 and the corresponding feedback signal on line 39 (input relay 27 and feedback relay 47). If that order of the feedback signal does not correspond to the input signal, the energizing voltage originating from power line 60 is directed through the contacts of relay 48 and over one or the other of lines 85 or 86 leading from the contacts of relay 48 and being directed toward the matrix output lines 53 or 54 leading to the motor. However, beginning with this lower order of the matrix, this motor energizing signal does not pass directly to the matrix output lines 53 and 54, but rather passes through one or the other of resistors 75 or 76 connected in series between relay lines 85 and 86 and lines 53 and 54, respectively, whereby the signal energizing the motor is reduced by the amount of attenuation provided by resistors 75 and 76. Thus the speed of the motor in responding to any error in position at this lower order is correspondingly reduced.

In the next lower order comparison an error between the feedback and input order signals likewise directs the energizing voltage over lines 87 or 88 leading from the contacts of feedback relay 49. These lines, in turn, are connected to the matrix output lines 53 and 54 through an additional resistor 77 and 78, respectively, whereby the energizing signal from the next lower order being directed to the motor is attenuated by two resistors 75, 77, or 76, 78, respectively. In the same manner, the energizing signals from the succeeding lower orders are progressively attenuated further, each through an additional resistor, such that the energizing voltage from the lowest order of the matrix passes through the series resistors 83, 81, 79, 77 and 75 or 84, 82, 80, 78 and 76 respectively. Thus, according to this feature of the invention, the error signal energizing the motor is progressively attenuated as the shaft driven by the motor closely approaches its desired position.

The shaft 20 driven by the motor 21 is not braked. When null is reached, an A.C. voltage comes out of the relay matrix.

This voltage is half-wave rectified by a pair of diodes 119, 120 shown in FIGURE 1, which are connected to a pair of resistor 121, 121a, the capacitors 122, 123 also shown in FIGURE 1, being used to filter the voltage.

This in effect supplies D.C. voltage to the motor by rectifying the A.C. voltage received from the relay matrix.

This rectified D.C. voltage brakes the shaft 20, driven by the motor 21.

According to a still further feature of the invention, there is provided means for comparing the present angular position of the motor shaft 20 with its desired angular position as commanded by the digital input signal and reversibly energizing the motor 21 so that the shaft driven by the motor rotates in the direction of smallest angular rotation to reach its commanded position. For example, if the shaft 20 driven by the motor is residing at 10° and the digital input signal calls for 40°, the motor is energized in the clockwise direction through an angle of 30°, whereas, if the shaft driven by the motor is at the 10° position and the input calls for a 350° position, the motor is energized in a counter-clockwise direction so that the shaft moves through an angle of 20° rather than in a clockwise direction through a large angle of 340°. Thus, this means enables the shaft 20 driven by the motor to be correctly positioned more rapidly.

Referring to FIGURE 1, this minor arc determining means comprises a plurality of sensing relays 90, 91, and 92 that are connected to detect the present position of the shaft 20 driven by the motor by being energized in response to different orders of the digital feedback signal. Relay 90 is energized over line 93 by the highest order of the feedback signal being directed over line 35; relay 91 is energized over line 94 in response to the second highest order of the feedback signal over line 36; and relay 92 is energized over line 95 responsively to the third highest order of the feedback signal over line 37. These sensing relays are inter-connected with both the reversing relays 69, controlling energization to the motor, and with given ones of the input relays, such as input relays 24 and 25, whereby under given preprogrammed conditions between the input signal and feedback signal, the motor 21 is energized so that its shaft rotates in the clockwise direction whereas for other conditions, the motor 21 is energized so that its shaft rotates in the counter-clockwise direction. Considering an example of the functioning of these relays and the reversing relay 69, let it be assumed that the shaft 20 driven by the motor is originally at its zero or null position and the input signal calls for a 20° displacement. In this instance, no one of the sensing relays 90, 91, nor 92, is energized, nor is the reversing relay 69, and consequently the motor energizing voltage being produced over matrix output line 53 is directed to movable contactor 66 of reversing relay 69 and thence to fixed contact 67 to energize motor winding 55, whereupon the motor 21 is energized in the clockwise direction until its shaft reaches the 20° position. On the other hand, if the digital input signal called for a position of 200° rather than 20°, the highest order input relay 24 would be energized and its upper contactor 100 would be made to engage lower fixed contact 101, thereby applying an energizing potential over line 102 to fixed contact 101 and upwardly to the contacts of sensing relay 90. Tracing this potential, this energizing potential passes upwardly over line 103 to the fixed contact 104 then to contactors 105 and 106 to fixed contact 107. From fixed contact 107 the potential is then directed to movable contactor 108 of relay 91 and then to fixed contact 109, and from contact 109 thence through contacts 110 and 111 of relay 92 and over line 112 to energize reversing relay 69. Upon relay 69 being energized, the potential being directed to the motor 21 is reversed and the shaft 20 driven by the motor is rotated counterclockwise from its zero position (or 360° position) to its 200° position, thereby traversing an arc of only 160° instead of the 200° arc it would traverse if driven clockwise. By tracing the circuit through the contacts of relay 90, 91, and 92 in this manner, it can be shown that the shaft driven by the motor 21 will always be driven through the smallest arc or smallest angle of rotation to reach its commanded position in the most direct manner as is desired.

It will be apparent to those skilled in the art, that the present invention is not limited to the specific details described above and shown in the drawings, and that various modifications are possible in carrying out the features of the invention and the operation, circuitry, and the method of utilization thereof, without departing from the spirit and scope of the appended claims.

What is claimed is:

1. In a digital-to-analog converted, an analog integrating device, a plurality of input lines adapted to receive a digitally coded signal, with each line corresponding to a different order of the digital signal input number, a like plurality of feedback lines adapted to receive a digitally coded feedback signal corresponding to the analog signal determined by the integrating device, with each line thereof corresponding to a different order of the feedback signal number, an analog-to-digital converter responsive to said integrating device to produce digital feedback signals over said feedback lines, and means for comparing the digital signal over each input line with the digital signal over the corresponding feedback line, and in the event such signals are not equalized producing a signal to reversibly add to and subtract from the indicating position of the integrating device until the digital signals on all input and feedback lines are the same, whereby said integrating device contains the equivalent of said input signal number in analog form, said analog integrating device comprising a motor having a rotating shaft supported thereby, the input number in analog form being represented by the angular position of the shaft of said motor relative to the nominal position thereof, said comparing means comprising a relay matrix having a plurality of relays responsive to signals over said input lines and a plurality of relays responsive to signals received from said feedback lines, each of said relays having a plurality of contacts the contacts of each of the input signal relays being connected in cascade with the corresponding contacts of the mating feedback relay, whereby when corresponding input and feedback relays are both simultaneously and equally energized, a signal is not directed to said integrating means, whereas when corresponding input and feedback relays are not simultaneously and equally energized, a signal is selectively added to or subtracted from the integrating means depending upon which of said relays is energized and which is de-energized, and means responsive to the angular position of the shaft of the motor and to the angular position of said shaft, called for by the digital input signal, to reversibly energize the motor whereby it rotates the shaft thereof, through the smallest arc to reach the position called for by the digital input signal.

2. In a digital-to-rotary position converter, an indicator device having a reversible motor incorporated therewith, said reversible motor having a rotatable shaft included therein, an analog-to-digital converter actuated by said reverisible motor to produce digital feedback signals according to the rotational angular position of the motor shaft, means adapted to receive digitally coded input signals, and responsive to the digital input signal for comparing each order of the input number coded signal with the corresponding order of the digital feedback signal and in the even said orders of signals are not the same reversibly energizing said motor to vary the rotative position of the shaft of said motor until each order of the digital input signal is the same as the corresponding order of the feedback signal, said comparing means operating sequentially to compare the digital signals from the highest to the lowest orders in time sequence, and means for progressively reducing the energization of the motor for lack of coincidence of the lower orders of the input and feedback signals, the analog to digital converter including a central shaft, a plurality of drums rotatably mounted on the central shaft, the drums being rotatable in stepped rotation relative to one another by a transfer mechanism located between each pair of adjoining drums, each of the drums having a series of circular segmental sections inserted in the outer surface thereof, the arcuate length of each of the segmental sections and the spacing therebetween indicating the angular position of a particular drum, at a particular time interval, said segmental sections in combination with brushes fixedly mounted in conjunction therewith, being operative to provide coded signals which indicate in a binary code, the angular position of each of the segmental sections of each drum and logic sensing means energized by said comparing means to reversibly energize said motor in the direction requiring minimum rotation of the motor shaft to reach the angular position called for by the input digital signal, said logic sensing means being responsive to both the digital feedback signals representing the angular position of the shaft of the motor and the digital input signals representing the desired position of the shaft of the motor to reverse the direction of energization of the motor when the difference between said digital signals is greater than one hundred and eighty degrees.

3. In a digital-to-rotary position converter having a motor fitted with a rotatable shaft, and an analog-to-digital converter actuated by the shaft of the motor for producing digital feedback signals corresponding to the position of the shaft of the motor, a relay matrix energizable by a digital input signal corresponding to the desired position of the shaft of the motor and energized by said digital feedback signals, said relay matrix having a different relay for each order of the digital input signal and a corresponding relay for each order of the digital feedback signal, with pairs of contacts of corresponding relays being connected in cascade with said motor, whereby upon energization of said contacts, the motor is reversibly energized to vary the angular position of the shaft of said motor, until said feedback digital signal is made equal to said digital input signal, the analog to digital converter including a central shaft, a plurality of drums rotatably mounted on the central shaft, the drums being rotatable in stepped rotation relative to one another by a transfer mechanism located between each pair of adjoining drums, each of the drums having a series of circular segmental sections inserted in the outer surface thereof, the arcuate length of each of the segmental sections and the spacing therebetween indicating the angular position of a particular drum, at a particular time interval, said segmental sections in combination with brushes fixedly mounted in conjunction therewith, being operative to provide coded signals which indicate in a binary code, the angular position of each of the segmental sections of each drum, the contacts of the relays in different orders being connected in cascade, whereby the contacts of the relays are energized in sequence from the highest orders to the lowest order, and means for progressively diminishing the degree of energization of said motor as its angular position approaches the position called for by said digital input signal, means responsive to the angular position of the shaft of the motor and to the angular position of said shaft, called for by the digital input signal, to reversibly energize the motor whereby it rotates the shaft thereof, through the smallest arc to reach the position called for by the digital input signal.

4. In a digital-to-rotary position converter, a motor fitted with a rotatable shaft, a shaft position-to-digital signal feedback converter actuated by the motor, comprising means energized by a digital input signal for comparing each order of the input signal with the corresponding order of the digital feedback signal in sequence from higher orders to lower orders and reversibly energizing said motor to rotate the shaft thereof until said digital input and feedback signals are the same, said comparing means including, a relay matrix energizable by a digital input signal corresponding to the desired position of the shaft of the motor and energized by the digital feedback signals, said relay matrix having a different relay for each order of the digital input signal and a corresponding relay for each order of the digital feedback signal, with pairs of contacts of corresponding relays being connected in cascade with said motor, whereby upon energization of said contacts, the motor is reversibly energized to vary the angular position of the shaft of said motor, until said feedback digital signal is made equal to said digital input signal, the contacts of the relays being energized in sequence from the highest order to the lowest order, means for progressively diminishing the degree of energization of said motor as its angular position approaches the position called for by said digital input signal and means responsive to the angular position of the shaft of the motor and to the angular position of said shaft, called for by the digital input signal, to reversibly energize the motor whereby it rotates the shaft thereof, through the smallest arc to reach the position called for by the digital input signal.

5. In a digital-to-analog converter, an analog integrating device, a plurality of input lines adapted to receive a digitally coded signal, with each line corresponding to a different order of the digital signal input number, a like plurality of feedback lines adapted to receive a digitally coded feedback signal corresponding to the analog signal determined by the integrating device, with each line thereof corresponding to a different order of the feedback signal number, an analog-to-digital converter responsive to said integrating device to produce digital feedback signals over said feedback lines, and means for comparing the digital signal over each input line with the digital signal over the corresponding feedback line, and in the event such signals are not equalized producing a signal to reversibly add to and subtract from the indicating position of the integrating device until the digital signals on all input and feedback lines are the same, whereby said integrating device contains the equivalent of said input signal number in analog form, said comparing means comprising a relay matrix having a plurality of relays responsive to signals over said input lines and a plurality of relays responsive to signals received from said feedback lines, each of said relays having a plurality of contacts and with contacts of each of the input signal relays being connected in cascade with the corresponding contacts of the mating feedback relay, whereby when corresponding input and feedback relays are both simultaneously and equally energized, a signal is not directed to said integrating means, whereas when corresponding input and feedback relays are not simultaneously and equally energized, a signal is selectively added to or subtracted from the integrating means depending upon which of said relays is energized and which is de-energized, and means for progressively diminishing the signal being added to and subtracted from the signal directed to the integrating device as the integrating device approaches the correct analog quantity.

References Cited by the Examiner
UNITED STATES PATENTS

| | | | |
|---|---|---|---|
| 2,796,566 | 6/57 | Maynard | 340—347 |
| 2,886,753 | 5/59 | Abbott | 340—347 |
| 3,066,867 | 12/62 | Krause | 235—154 |

MALCOLM A. MORRISON, *Primary Examiner.*
IRVING L. SRAGOW, *Examiner.*